United States Patent
Sobecki

(10) Patent No.: US 11,338,725 B2
(45) Date of Patent: *May 24, 2022

(54) VEHICULAR TAILGATE ILLUMINATION SYSTEM WITH ADJUSTABLY POSITIONED ILLUMINATION DEVICE

(71) Applicant: Magna Mirrors of America, Inc., Holland, MI (US)

(72) Inventor: Justin E. Sobecki, Rockford, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,052

(22) Filed: Oct. 12, 2020

(65) Prior Publication Data

US 2021/0023981 A1 Jan. 28, 2021

Related U.S. Application Data

(63) Continuation of application No. 16/599,145, filed on Oct. 11, 2019, now Pat. No. 10,800,320.

(60) Provisional application No. 62/744,703, filed on Oct. 12, 2018.

(51) Int. Cl.
*B60Q 1/24* (2006.01)

(52) U.S. Cl.
CPC ............ *B60Q 1/24* (2013.01); *B60Q 2400/50* (2013.01)

(58) Field of Classification Search
CPC .......... B60Q 1/24; B60Q 2400/50; B60Q 1/56
See application file for complete search history.

(56) References Cited

U.S. PATENT DOCUMENTS

| | | | |
|---|---|---|---|
| 4,896,136 A | 1/1990 | Hotovy | |
| 6,077,576 A | 6/2000 | Osborn | |
| 6,086,230 A | 7/2000 | Wooldridge et al. | |
| 6,409,367 B1 * | 6/2002 | Pratt | B60R 9/06 362/505 |
| 6,416,209 B1 | 7/2002 | Abbott | |
| 8,801,245 B2 | 8/2014 | De Wind et al. | |
| 8,917,437 B2 | 12/2014 | Baur et al. | |
| 9,896,026 B2 | 2/2018 | Snider | |
| 10,155,474 B2 * | 12/2018 | Salter | B60Q 1/0011 |
| 10,501,008 B2 | 12/2019 | Snider | |
| 10,604,064 B2 | 3/2020 | Kuhl et al. | |

(Continued)

*Primary Examiner* — Bryon T Gyllstrom
*Assistant Examiner* — Christopher E Dunay
(74) *Attorney, Agent, or Firm* — Honigman LLP

(57) ABSTRACT

A tailgate illumination system includes an illumination device having (i) a tailgate bracket configured for mounting at a tailgate of a vehicle and (ii) a pivot bracket pivotally mounted at the tailgate bracket. The pivot bracket supports a light source that, when powered, emits light. With the tailgate bracket mounted at the vehicle tailgate, the pivot bracket pivots relative to the tailgate bracket responsive to gravitational force acting on the pivot bracket as the tailgate moves from a closed position to an opened position. With the tailgate bracket mounted at the vehicle tailgate, and with the tailgate in the closed position, light emitted by the light source, when powered, illuminates a ground region rearward of the vehicle. With the tailgate bracket mounted at the vehicle tailgate, and when the tailgate is in the opened position, light emitted by the light source, when powered, illuminates the ground region rearward of the vehicle.

31 Claims, 7 Drawing Sheets

TAIL GATE DOWN
MODULE DOWN

(56) References Cited

U.S. PATENT DOCUMENTS

| | | | |
|---|---|---|---|
| 10,800,320 B2 | 10/2020 | Sobecki | |
| 2005/0046696 A1* | 3/2005 | Lang | H04N 7/183 |
| | | | 348/148 |
| 2007/0274087 A1 | 11/2007 | Herold | |
| 2009/0129112 A1* | 5/2009 | Shamitz | B60Q 1/56 |
| | | | 362/549 |
| 2011/0211362 A1 | 9/2011 | Heiden et al. | |
| 2012/0118719 A1 | 5/2012 | Harrop et al. | |
| 2014/0198515 A1 | 7/2014 | Tulio et al. | |
| 2014/0320823 A1 | 10/2014 | Ammar et al. | |
| 2015/0043231 A1* | 2/2015 | Clark | G09F 21/048 |
| | | | 362/485 |
| 2015/0198300 A1* | 7/2015 | Huebner | F21S 43/00 |
| | | | 362/520 |
| 2015/0217685 A1* | 8/2015 | Salter | H05B 47/115 |
| | | | 362/485 |
| 2015/0224919 A1 | 8/2015 | Sobecki et al. | |
| 2016/0001700 A1* | 1/2016 | Salter | B60Q 1/24 |
| | | | 362/510 |
| 2016/0167568 A1* | 6/2016 | Salami, Jr. | B60Q 1/0088 |
| | | | 362/523 |
| 2017/0238277 A1* | 8/2017 | Irgang | F21S 41/192 |
| | | | 362/516 |
| 2017/0246985 A1* | 8/2017 | Dellock | B60Q 1/2696 |
| 2017/0274940 A1* | 9/2017 | Povinelli | B60R 5/041 |
| 2018/0281674 A1* | 10/2018 | Iseki | F21S 43/237 |
| 2019/0032374 A1 | 1/2019 | Linden et al. | |
| 2019/0106051 A1 | 4/2019 | Huizen et al. | |
| 2019/0106053 A1* | 4/2019 | Chen | B60Q 3/80 |
| 2019/0309564 A1 | 10/2019 | Mitchell et al. | |
| 2020/0094736 A1* | 3/2020 | Augusty | B60Q 1/307 |

\* cited by examiner

Tailgate UP

Tailgate DOWN

TAIL GATE DOWN
MODULE UP

TAIL GATE UP
MODULE UP

TAIL GATE UP
MODULE DOWN

TAIL GATE DOWN
MODULE DOWN

VEHICULAR TAILGATE ILLUMINATION SYSTEM WITH ADJUSTABLY POSITIONED ILLUMINATION DEVICE

CROSS REFERENCE TO RELATED APPLICATIONS

The present application is a continuation of U.S. patent application Ser. No. 16/599,145, filed Oct. 11, 2019, now U.S. Pat. No. 10,800,320, which claims the filing benefits of U.S. provisional application Ser. No. 62/744,703, filed Oct. 12, 2018, which is hereby incorporated herein by reference in its entirety.

FIELD OF THE INVENTION

The present invention relates generally to the field of exterior lighting for vehicles and, more particularly, to ground illumination lights for vehicles.

BACKGROUND OF THE INVENTION

It is known to provide ground illumination lights at a vehicle to provide light at the ground region at the sides and/or rear of the vehicle.

SUMMARY OF THE INVENTION

The present invention provides an adjustably positioned tailgate light module that provides ground illumination and/or an icon projection at the ground region at the rear of a vehicle and that provides similar illumination when the tailgate is raised or closed as compared to when the tailgate is lowered or opened. The light module pivots responsive to gravitational forces at a weighted pivot arm as the tailgate is moved between its raised or closed position and its lowered or opened position. The light module may project an icon or character or logo onto the ground region and the light module or tailgate assembly may provide a magnifying optic so that the size of the projected icon is generally the same when the tailgate is raised or lowered.

These and other objects, advantages, purposes and features of the present invention will become apparent upon review of the following specification in conjunction with the drawings.

DESCRIPTION OF THE PREFERRED EMBODIMENTS

Figure 1:
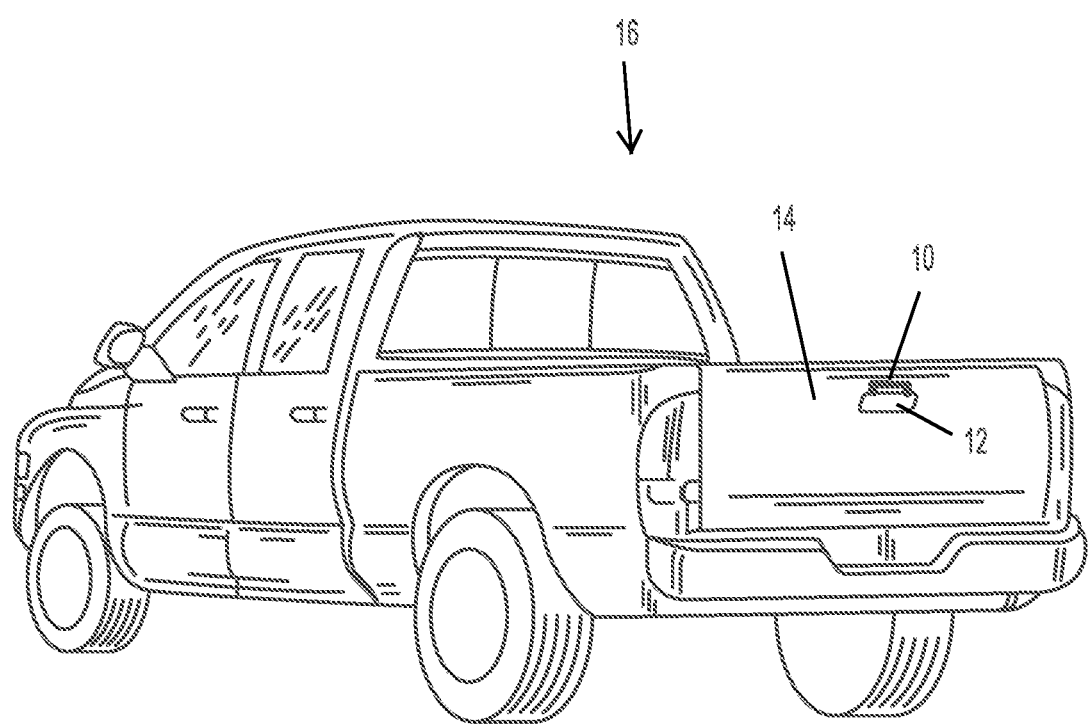
FIG. 1 is a rear perspective view of a vehicle with a light module in accordance with the present invention.
Figure 2:
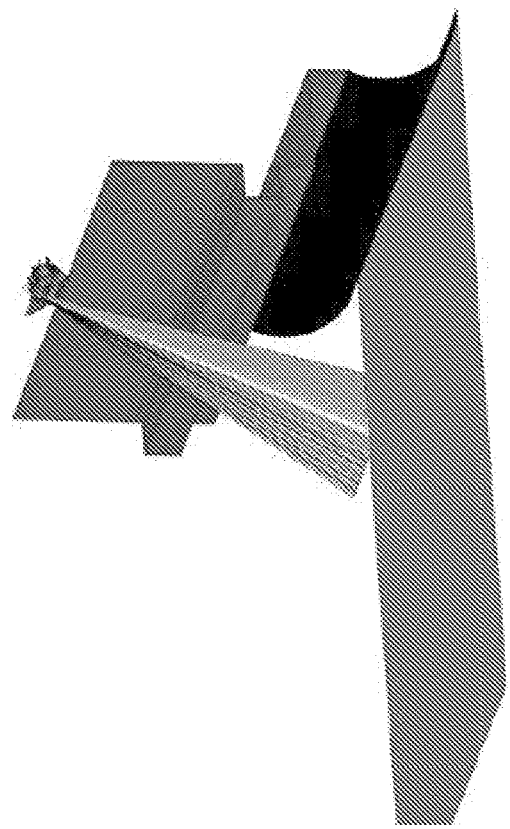
FIG. 2 is a schematic showing the light module light beam when the tailgate is up.

Referring now to the drawings and the illustrative embodiments depicted therein, an illumination module 10 may be incorporated into a tailgate handle 12 at a tailgate 14 of a vehicle 16 (FIGS. 1 and 2). The tailgate handle module or assembly 12 includes a housing 18 that houses or supports the illumination module 10, which is operable to emit light (such as ground illumination light and/or an icon or indicia, as discussed below) downward toward the ground at the rear of the vehicle. The illumination module 10 is pivotally mounted at the tailgate handle module 12 and is pivotable between a downward pointing or directed orientation (where light emitted by the illumination module is directed downward toward the ground at the rear of the vehicle when the tailgate is in its raised or closed position) and an upward pointing or directed orientation (where light emitted by the illumination module is directed downward toward the ground at the rear of the vehicle when the tailgate is in its lowered or opened position), as also discussed below.

Figure 3:
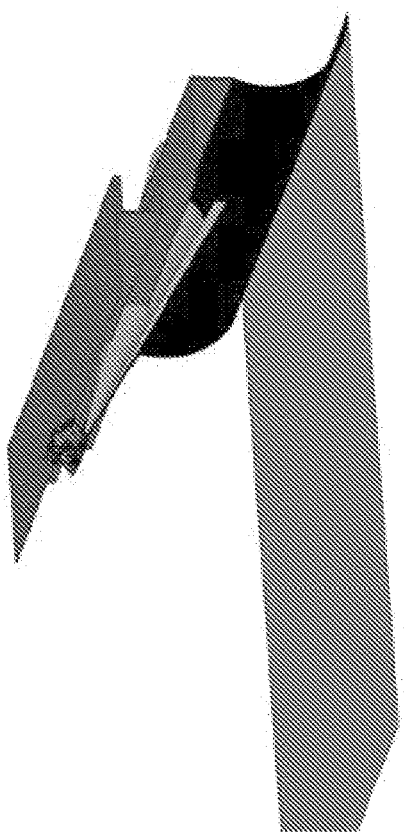
FIG. 3 is another schematic showing the light module light beam when the tailgate is lowered and if the light module did not pivot to an upward orientation.

As shown in FIG. 2, when the tailgate is raised or closed, illumination from the illumination module is downward to illuminate (and/or project an icon toward) the ground region rearward of the vehicle. When the tailgate is lowered or opened (FIG. 3), the illumination (if the illumination module were to remain fixed at the tailgate) would be directed toward the area under the vehicle. However, even though the tailgate rotates the handle module 90 degrees (as the tailgate is swung between the raised/closed position and the lowered/opened position), the illumination module of the present invention pivots relative to the handle module in response to the change in orientation of the tailgate, so that the illumination (and/or projected icon) is directed downward toward the ground region rearward of the vehicle when the tailgate is in either position. Thus, the illumination module's orientation relative to the ground does not change, which allows the illumination module to be able to project an icon or image that is non-distorted at both positions of the tailgate.

The illumination module may comprise a ground illumination light and/or a logo light packaged into the tailgate door handle. The illumination module may project a non-distorted icon or image when the tailgate is in the upright or raised or closed position and the down or lowered or opened position. The illumination module may use only one light module with a single light emitting diode (LED).

The illumination module may be pivoted or rotated (as the tailgate pivots between the opened and closed positions) electrically or mechanically responsive to the pivoting of the tailgate. For example, the illumination module or a mirroring mechanism may be rotated by a solenoid or a motor responsive to a signal from a door control module (DCM) that is indicative of the tailgate position or state. Optionally, the illumination module may include a small rotating mirror and may use gravity to rotate the mirror and/or to move the mirror in front of the projected or emitted light. For such non-passive systems (e.g., solenoid or motor powered), one or more tilt sensors could be added to the PCB of the illumination module or the tailgate handle module to sense the orientation of the lift gate and to automatically change the state of the illumination module responsive to the sensed tail gate orientation.

Thus, a tailgate illumination system for a tailgate of a vehicle may comprise a tailgate bracket mounted at a tailgate of a vehicle, and a pivot bracket pivotally mounted at the tailgate bracket. The pivot bracket supports an illumination device that, when powered, emits light. A controller is operable to pivot the pivot bracket relative to the tailgate bracket responsive to an input indicative of a change of orientation of the tailgate. Thus, when the tailgate of the vehicle pivots between its raised position and its lowered position, the controller pivots the pivot bracket to adjust the principal beam axis of light emitted by the illumination device. The tailgate illumination system may comprise a tilt sensor disposed at the tailgate, whereby the controller pivots the pivot bracket responsive to an output of the tilt sensor that is indicative of a change in orientation of the tailgate. The illumination device and the tilt sensor may be disposed at a printed circuit board of the illumination device.

Optionally, the illumination module is pivoted responsive to opening and closing of the tailgate without electronic input or control of a pivot mechanism. For example, the illumination module may comprise a gravity powered flipper that pivots or flips the illumination module responsive to gravity and change of position of the tailgate as the tailgate is opened/closed. A mass or weighted lever is mechanically linked to the illumination module so it changes the position of the illumination module when the tailgate changes position. Thus, the illumination module provides the adjustment or rotating or flipping without electronic input from the DCM.

Figure 4:
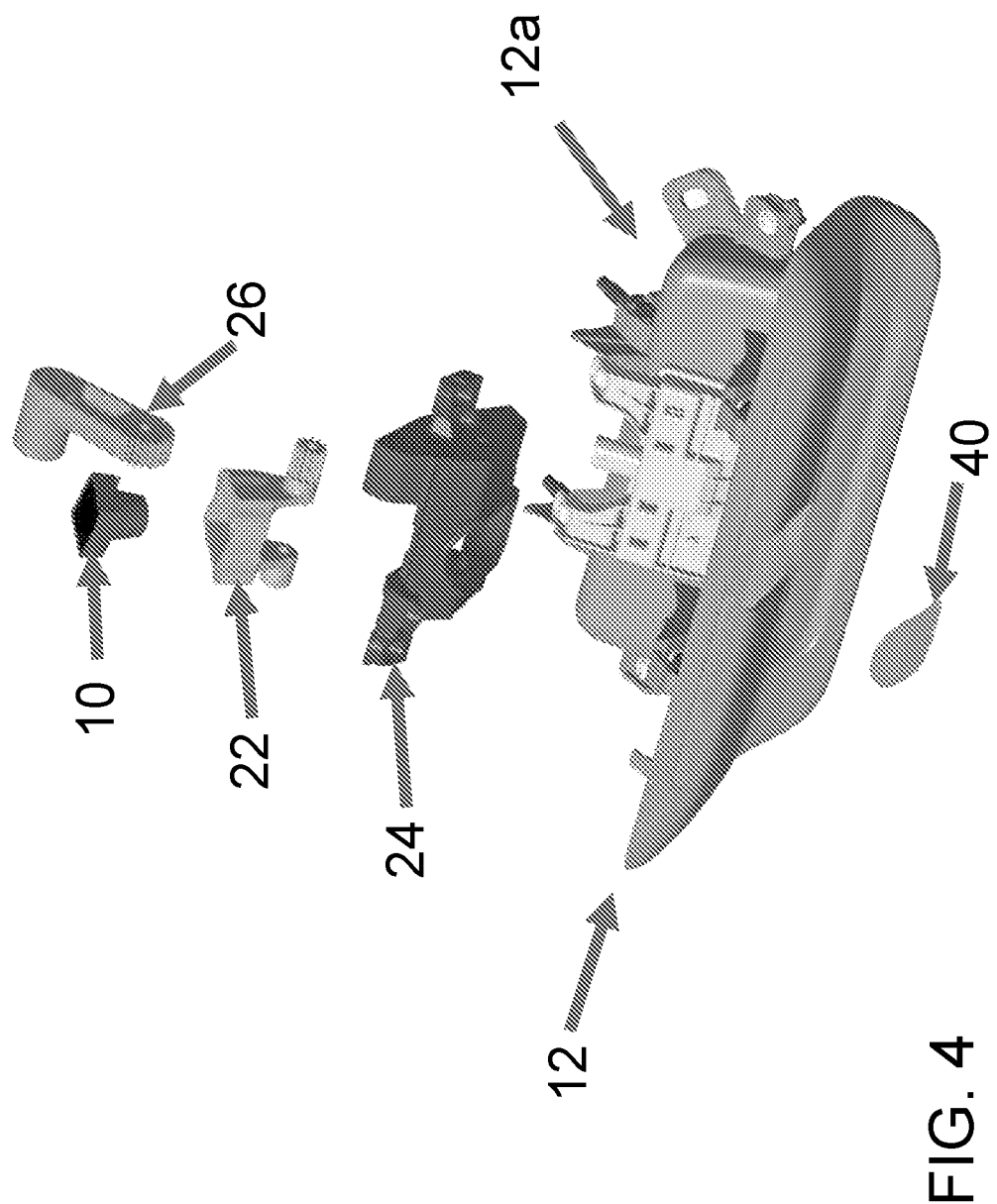
FIGS. 4 and 5 are exploded perspective views of the tailgate handle assembly including the light module.
Figure 5:
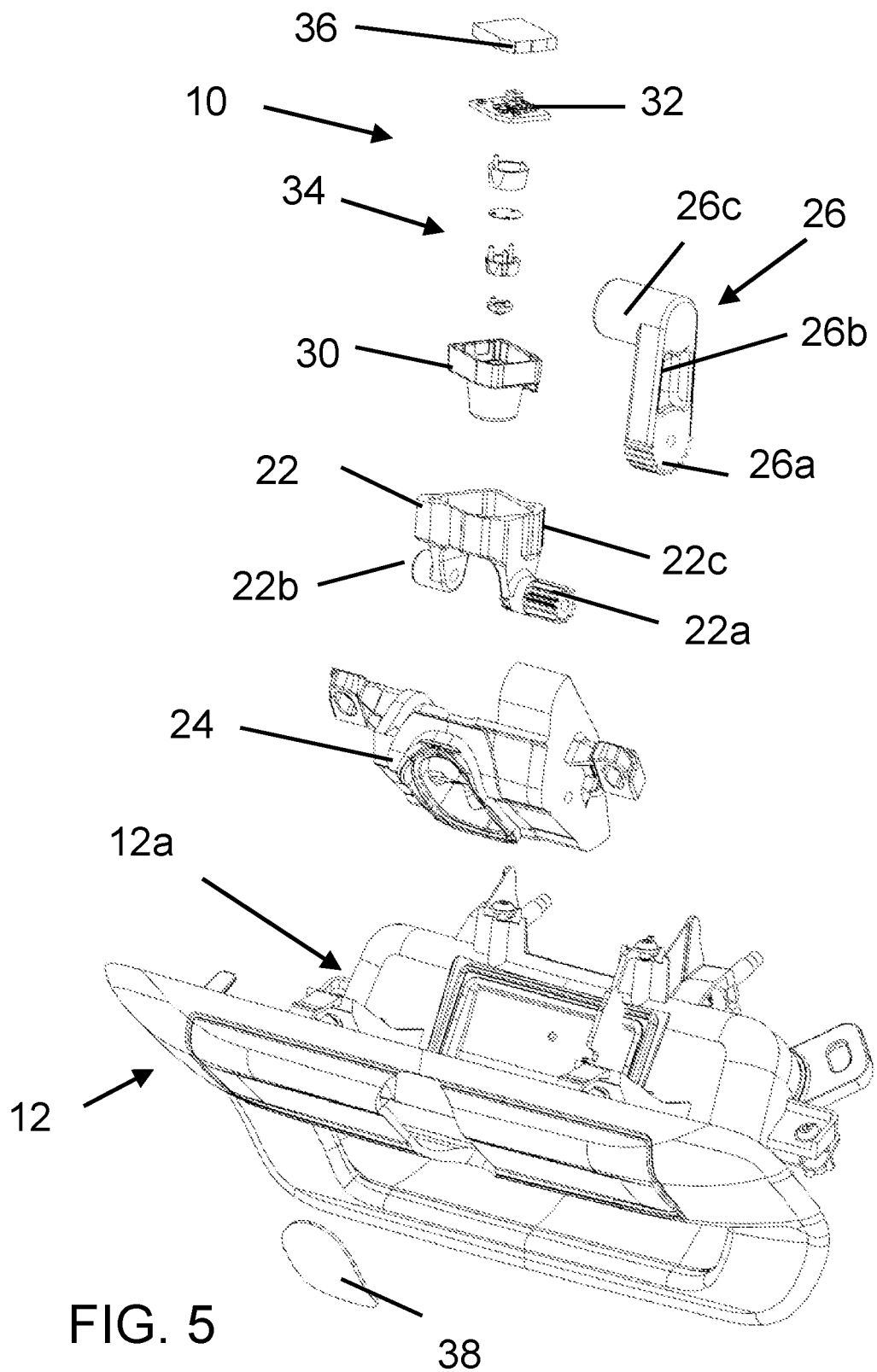
Figure 7:
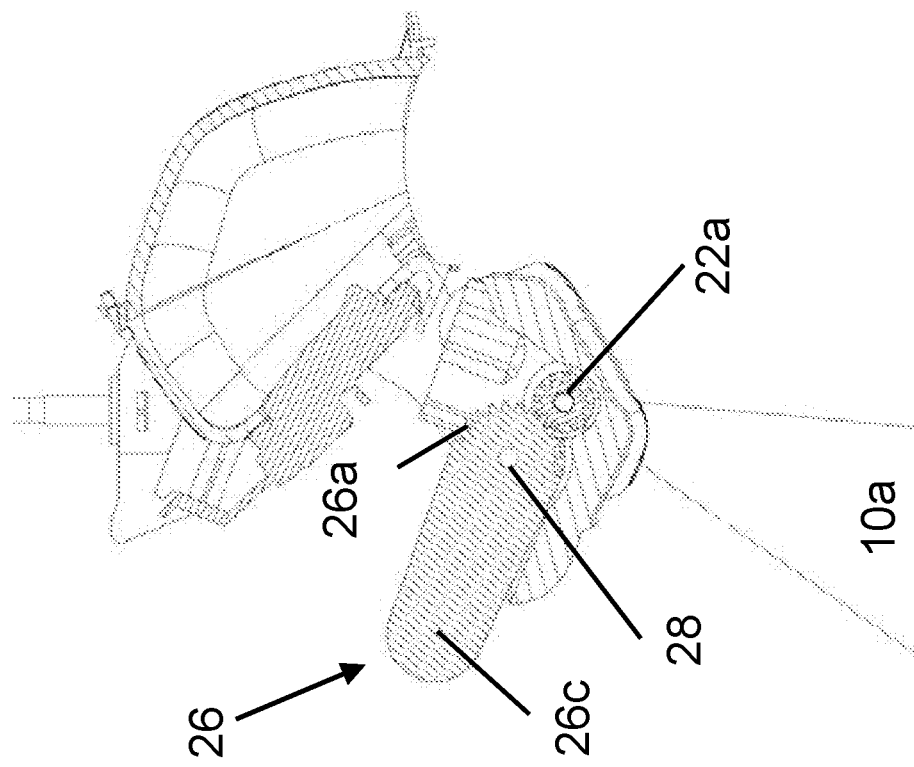
FIGS. 6-11 are side elevation and cross sectional views of the tailgate handle assembly, showing pivotal movement of the light module and weighted pivot arm as the tailgate is moved to its raised position and to its lowered position.

In the illustrated embodiment, and such as shown in FIGS. 4 and 5, the illumination module 10 is disposed at or received at or in a flip bracket or rotating bracket 22 that is pivotally mounted at a module bracket 24 that is mounted at the handle assembly or module 12, such as at a handle assembly bracket 12a (optionally, the module bracket 24 may be integrated with the handle assembly bracket 12a). The handle assembly bracket is fixedly mounted at the tailgate and pivots with the tailgate as the tailgate is pivoted between the raised or closed position and the lowered or opened position. A flip mass or weighted arm 26 functions to pivot or rotate the rotating bracket 22 (and the illumination module 10) relative to the module bracket 24 as the orientation of the handle assembly 12 changes (via opening or closing the tailgate).

In the illustrated embodiment, the rotating bracket 22 pivotally attaches at the module bracket 24 via a pair of pivot arms 22a, 22b that are pivotally received in correspondingly formed receiving portions of the bracket 24. The illumination module 10 is received in a housing portion 22c of the rotating bracket 22, with the illumination module configured (when received in the housing portion 22c) to emit light through the brackets 22, 24 and 12a. One of the pivot arms 22a of the bracket 22 has gear teeth that engage corresponding gear teeth 26a of the flip mass 26.

Figure 6:
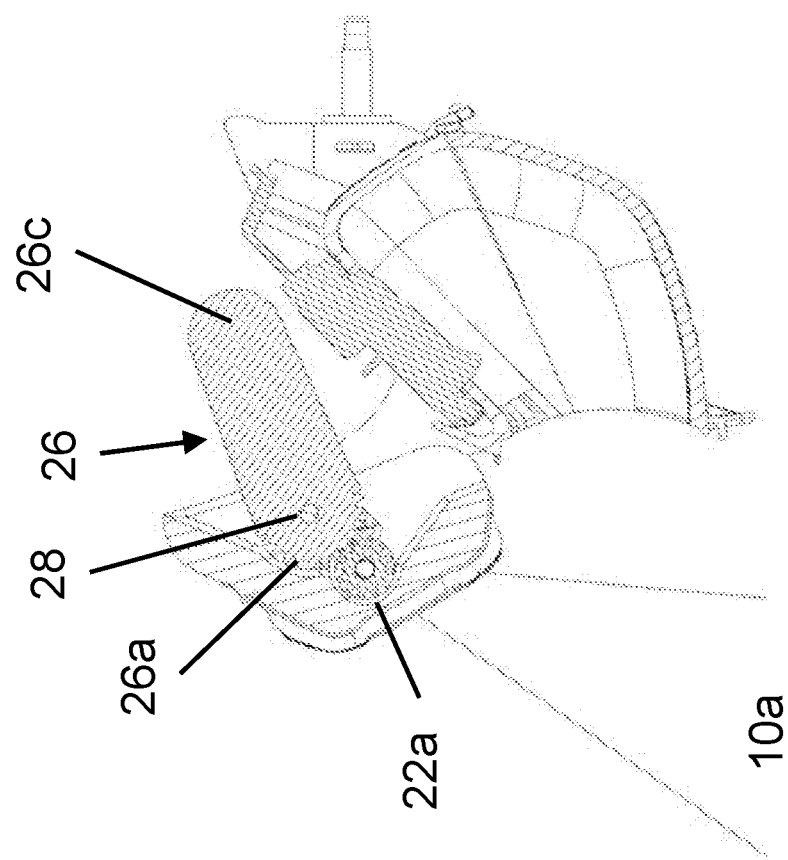
Figure 9:
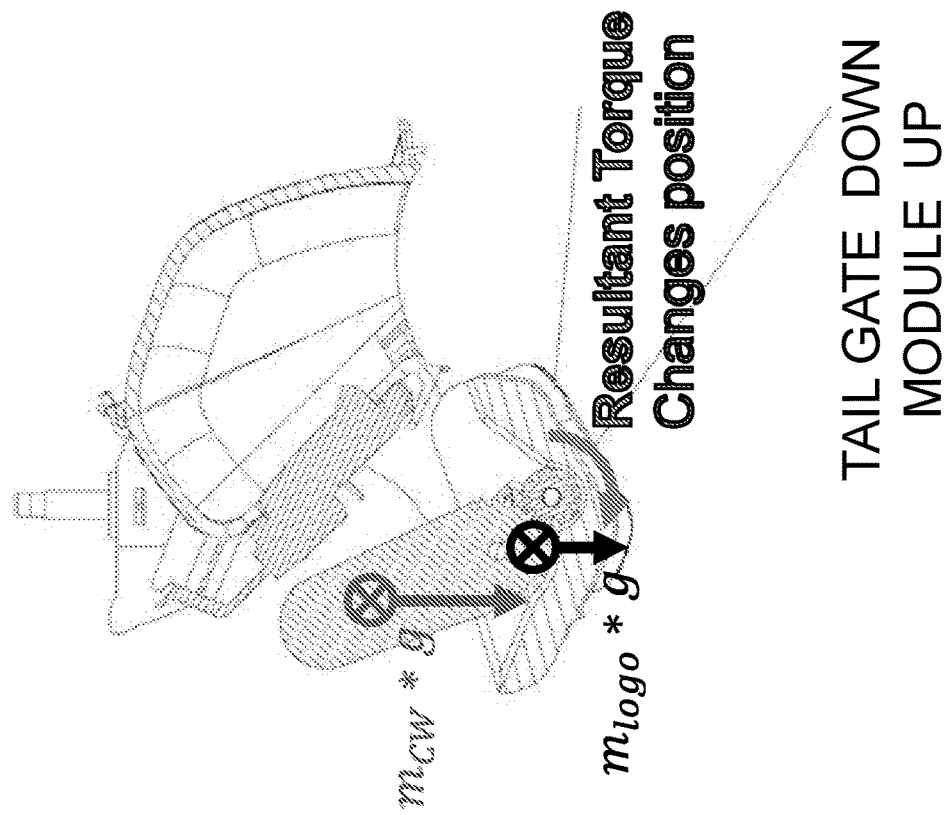

The flip mass or weighted arm 26 comprises an arm or lever 26b with the gear teeth 26a at one end and a weight or mass 26c at the other end. The flip mass 26 is pivotally mounted to the bracket 24 (such as via a pivot pin 28 or the like), with the pivot axis of the flip mass 26 spaced from and parallel to the pivot axis of the rotating bracket 22, and with the gear teeth 26a at the end of the flip mass engaged with the gear teeth of the pivot arm 22a of the rotating bracket 22. Thus, pivotal movement of the flip mass 26 in one direction (such as the counterclockwise direction in FIG. 6) about its pivot axis causes pivotal movement of the rotating bracket 22 (and illumination module 10) in the opposite direction (such as the clockwise direction in FIG. 6) about its pivot axis.

With reference to FIGS. 6-11, the flip mass 26 pivots responsive to a change in orientation of the bracket 24 (and handle assembly 12 and tailgate 14), whereby the center of gravity of the flip mass moves from one side of its pivot point or pin 28 to the other. For example, when the tailgate is up (FIGS. 6 and 8), the flip mass 26 has its weight 26c at a forward side of the pivot pin and thus retains the illumination module 10 in its downward directed orientation. When the tailgate is lowered (FIGS. 7 and 10), the flip mass 26 has its weight 26c at a rearward side of the pivot pin (due to the change in gravitational force direction at the flip mass as the tailgate pivots downward) and thus pivots the illumination module toward its upward directed orientation, so that the illumination beam (or principal axis of the light emitted by the module) is generally the same direction as when the tailgate is raised and the illumination module is in its downward orientation (compare the illumination beams 10a of FIGS. 6 and 7). Thus, the illumination module functions to illuminate generally the same ground region when the tailgate is in the raised or closed position as when the tailgate is in the lowered or opened position.

Figure 8:
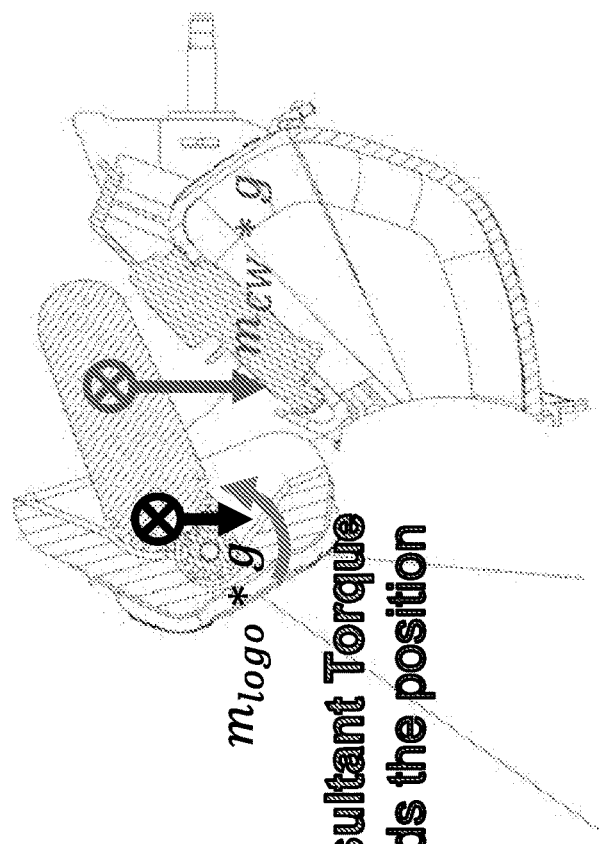
Figure 11:
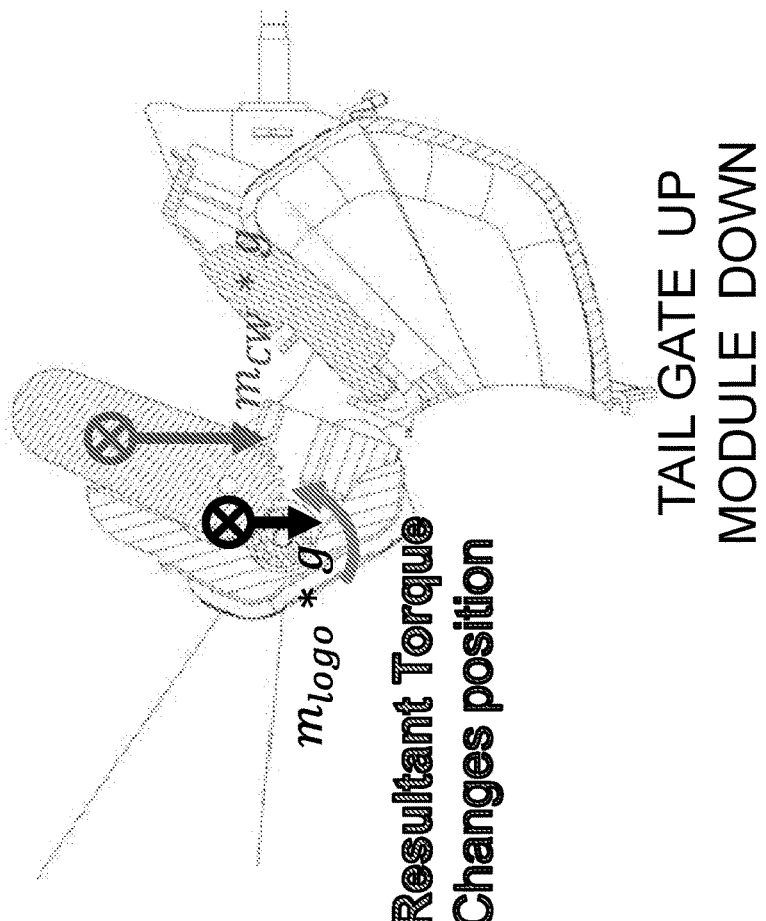
Figure 10:
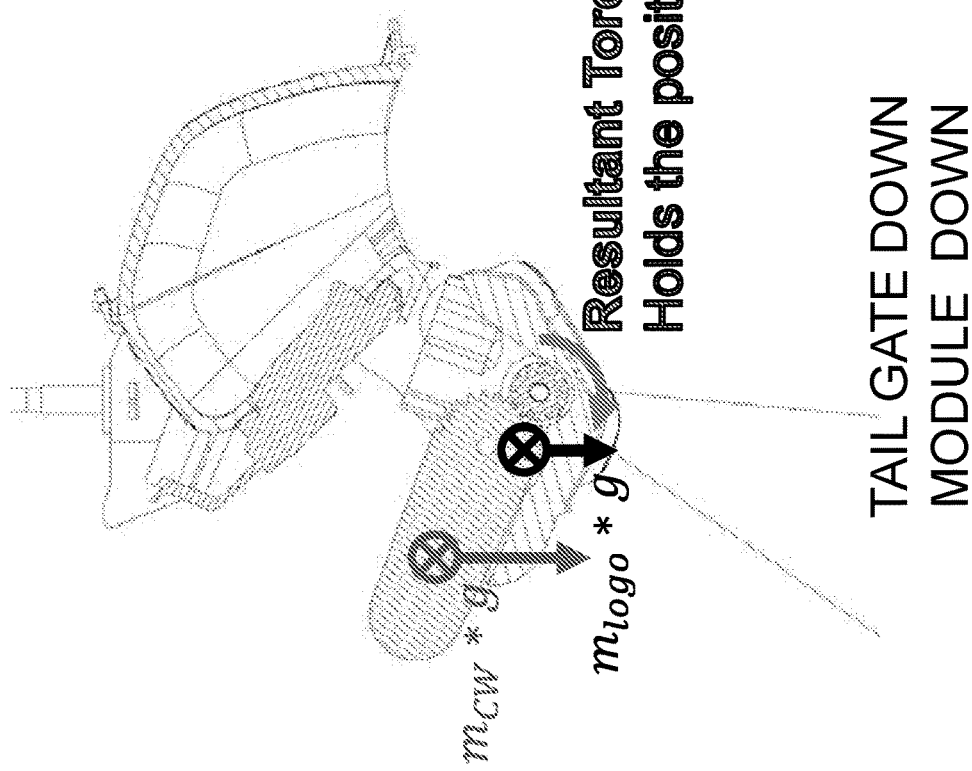

FIGS. 8-11 show force vectors at the illumination module (due to the weight of the illumination module and rotating bracket) and at the flip mass (due to the weight of the flip mass and its weighted end). As can be seen with reference to FIG. 8 (which is the same as FIG. 6, but with the force vectors added), the resultant torque about the pivot axis (due to the difference between the torque from the weight at the center of gravity of the illumination module and rotating bracket and the torque from the weight at the center of gravity of the flip mass) at the rotating bracket is in the clockwise direction when the tailgate is raised, which imparts a counterclockwise rotation of the rotating bracket. When the tailgate is swung toward the lowered position (FIG. 9), the weighted end 26c of the flip mass moves to the other side of the pivot axis or pin 28a so that the resultant torque is in the counterclockwise direction, which imparts a clockwise rotation of the rotating bracket to pivot the illumination module from its downward orientation (FIG. 9) to its upward orientation (FIG. 10). Likewise, when the tailgate is raised, the resultant torque about the pivot axis at the rotating bracket is in the clockwise direction when the tailgate is raised, which imparts a counterclockwise rotation of the rotating bracket to pivot the illumination module from its upward orientation (FIG. 11) to its downward orientation (FIG. 8). Although shown in FIGS. 9 and 11 as having the tailgate down and module up and the tailgate up and module down, those are shown for illustration purposes only, as the illumination module would pivot as the tailgate is being raised or lowered such that the module would pivot to its up or down position as or before the tailgate reached its respective lowered or raised position.

In the illustrated embodiment, the flip mass 26 is mechanically linked to the module via a 2:1 gear ratio, such that the flip mass 26 only moves 45 degrees yet pivots the illumination module 90 degrees. Since the mass of the flip mass 26 is much greater than the mass of the module 10 (and rotating bracket 22), the resultant torque either holds the module in the desired position or changes the state of the module when the tailgate is flipped/opened/closed.

As shown in FIG. 5, the illumination module comprises a housing 30 that houses at least one light emitting diode (such as a high power LED) disposed at a circuit element or printed circuit board 32. The illumination module 10 includes a lens or lens assembly 34 (and may include a freeform lens optic and/or masking element that is/are formed to provide the desired or appropriate illumination pattern at the ground rearward of the vehicle equipped with the tailgate handle assembly). The lens optic and circuit element may be disposed at or supported at the housing and the circuit element may be sealed at the housing via a potting material 36, whereby electrically conductive terminals of the circuit element extend from the housing and through the potting material to electrically connect at an electrical connector of the tailgate handle or of the vehicle. The illumination module may be disposed at an upper region of the tailgate handle assembly, and the tailgate handle assembly may include a cover element 38 (such as a light-transmitting transparent or diffuse or clear or tinted plastic or glass element through which illumination passes) that snap-attaches (or otherwise attaches) at the upper region of the tailgate handle assembly to encase the illumination module (and optionally a rear backup camera as well) at the tailgate handle assembly.

Thus, the tailgate illumination system includes a tailgate bracket mounted at a tailgate of a vehicle, an illumination device pivotally mounted at the tailgate bracket, with the illumination device, when powered, emitting light. The illumination device is pivotable relative to said tailgate bracket about a first pivot axis, and a weighted arm is pivotally mounted at the tailgate bracket and pivotable relative to the tailgate bracket about a second pivot axis. The second pivot axis is parallel to and offset from the first pivot axis, and the first pivot axis is horizontal and perpendicular to a longitudinal axis of the vehicle. Pivotal movement of the weighted arm about the second pivot axis relative to the tailgate bracket imparts pivotal movement of the pivot bracket about the first pivot axis relative to the tailgate bracket.

When the tailgate of the vehicle pivots between a raised position and a lowered position, the weighted arm pivots about the second pivot axis as the weighted end of the weighted arm moves from one side (e.g., the forward side) of the second pivot axis to another side (e.g., the rearward side) of the second pivot axis due to gravitational forces at the weighted end of the weighted arm to impart pivotal movement of the illumination device about the first pivot axis. The illumination device thus pivots about the first pivot axis responsive to pivotal movement of the weighted arm about the second pivot axis so that light emitted by the illumination device, when powered, is directed downward toward a ground region rearward of the vehicle when the tailgate is in the raised position and when the tailgate is in the lowered position. The pivotal movement of the weighted arm about the second pivot axis is in a direction opposite from a direction of pivotal movement of the pivot bracket about the first pivot axis.

The illumination module 10 thus provides uniform light distribution at the ground to the rear of the vehicle and optionally and preferably spanning the entire width of the tailgate and vehicle. The illumination module may provide uniform light at the rear bumper of the vehicle and at a trailer hitch of the vehicle so as to illuminate the trailer hitch to enhance hitching a trailer to the vehicle in low ambient lighting conditions. The illumination module may also be utilized to illuminate at least a portion of a field of view of a rear backup camera (such as a rear backup camera disposed at or incorporated in the tailgate handle module or assembly). In such an application, the illumination module may be activated or powered responsive to the vehicle being shifted into a reverse gear and optionally also only activated or powered when such shifting occurs at an ambient light level that is below a threshold illumination level (in other words, the activation of the illumination module may be responsive to both shifting into a reverse gear and an ambient light sensor). Optionally, the vehicular camera may also pivot as the tailgate assembly is pivoted between the raised and lowered positions, and optionally, the vehicular camera may pivot with the illumination device, such as responsive to the weighted arm, as the tailgate assembly is pivoted between the raised and lowered positions.

Thus, the tailgate illumination module of the present invention provides downward directed light (for ground illumination and/or for icon projection or the like) when the tailgate is raised and when the tailgate is lowered, without requiring a pivot motor or the like that controls the orientation of the illumination module responsive to a control module that sends signals indicative of the orientation of the tailgate. Thus, the tailgate illumination module of the present invention provides pivoting of the illumination module due to gravitational forces at the module that cause pivoting of the module as the orientation of the tailgate changes. Dampers and/or rubber bumpers could be added to the end of travel or pivotal movement to reduce noise and bounces.

Optionally, the tailgate assembly may include an optical magnifying lens at the cover at one position (such as at the upward or downward position). The module is closer to the ground when the tailgate is down, which creates a smaller image when compared to the tailgate up position. The optical magnifying lens may magnify the projected image when the tailgate is lowered (where the illumination module is closer from the ground) so that the projected image on the ground would be the same size in both states of the tailgate.

The tailgate handle area provides a good vantage point for illuminating the hitch/bumper area. By using tailored or freeform optics, the light distribution can be very uniform at the area rearward of the vehicle. The illumination module and handle assembly may utilize aspects of the tailgate handle and illumination modules described in U.S. Pat. Nos. 8,917,437 and/or 8,801,245, and/or U.S. Publication Nos. US-2019-0106051 and/or US-2015-0224919, which are hereby incorporated herein by reference in their entireties.

Optionally, the pivotable illumination module and/or handle assembly may be suitable for use on other types of rear doors of vehicles, such as a liftgate or the like, where the illumination module may pivot (in a similar manner as described above) as the liftgate is pivoted between its lowered or closed position and its raised or opened position at the rear of the vehicle. The illumination module may be configured to provide downward illumination when the liftgate is opened so as to illuminate the area below and forward of the liftgate so a user can see into the rear of the vehicle, and may pivot to maintain downward illumination (such as for a rear backup camera) when the liftgate is closed. The degree of pivotal movement of the illumination module may be selected to provide illumination at different regions depending on the particular application of the illumination module, such as for illuminating downward onto the ground region or for illuminating downward and forward into the rear of the vehicle when the liftgate is opened.

Changes and modifications in the specifically described embodiments may be carried out without departing from the principles of the present invention, which is intended to be limited only by the scope of the appended claims as interpreted according to the principles of patent law.

The invention claimed is:

1. A tailgate illumination system for providing illumination rearward of a vehicle having a tailgate, the tailgate illumination system comprising:

an illumination device, the illumination device comprising (i) a tailgate bracket configured for mounting at a tailgate of a vehicle and (ii) a pivot bracket pivotally mounted at the tailgate bracket, wherein the pivot bracket supports a light source that, when powered, emits light;

wherein the light source comprises at least one light emitting diode;

wherein the tailgate of the vehicle is movable between a closed position and an opened position;

wherein, with the tailgate bracket mounted at the tailgate of the vehicle, the pivot bracket pivots relative to the tailgate bracket responsive to gravitational force acting on the pivot bracket as the tailgate moves from the closed position to the opened position;

wherein, with the tailgate bracket mounted at the tailgate of the vehicle, and with the tailgate in the closed position, light emitted by the light source, when powered, illuminates a ground region rearward of the vehicle; and wherein, with the tailgate bracket mounted at the tailgate of the vehicle, and when the tailgate is in the opened position, light emitted by the light source, when powered, illuminates the ground region rearward of the vehicle.

2. The tailgate illumination system of claim 1, wherein the illumination device comprises a weighted arm comprising a pivot end pivotally mounted at the tailgate bracket and a weighted end opposite the pivot end, and wherein the weighted arm pivots relative to the tailgate bracket responsive to gravitational force acting on the weighted arm as the tailgate moves from the closed position to the opened position.

3. The tailgate illumination system of claim 2, wherein the pivot bracket pivots relative to the tailgate bracket about a first pivot axis, and wherein the weighted arm pivots relative to the tailgate bracket about a second pivot axis that is parallel to and offset from the first pivot axis, and wherein pivotal movement of the weighted arm about the second pivot axis relative to the tailgate bracket imparts pivotal movement of the pivot bracket about the first pivot axis relative to the tailgate bracket.

4. The tailgate illumination system of claim 3, wherein pivotal movement of the weighted arm about the second pivot axis is in a direction opposite from a direction of pivotal movement of the pivot bracket about the first pivot axis.

5. The tailgate illumination system of claim 3, wherein, with the tailgate bracket mounted at the tailgate of the vehicle, the first pivot axis is horizontal and perpendicular to a longitudinal axis of the vehicle.

6. The tailgate illumination system of claim 3, wherein, as the tailgate of the vehicle moves between the closed position and the opened position, the weighted arm pivots about the second pivot axis as the weighted end of the weighted arm moves from one side of the second pivot axis to another side of the second pivot axis due to gravitational force acting at the weighted end of the weighted arm to impart pivotal movement of the pivot bracket about the first pivot axis.

7. The tailgate illumination system of claim 6, wherein, when the tailgate is in the closed position, the weighted end of the weighted arm is at a forward side of the second pivot axis, and, when the tailgate is in the opened position, the weighted end of the weighted arm is at a rearward side of the second pivot axis.

8. The tailgate illumination system of claim 7, wherein, with the tailgate bracket mounted at the tailgate of the vehicle, and as the tailgate moves from the opened position toward the closed position, the weighted arm pivots about the second pivot axis as the weighted end of the weighted arm moves from the rearward side of the second pivot axis to the forward side of the second pivot axis and imparts pivotal movement of the pivot bracket relative to the tailgate bracket so that light emitted by the light source, when powered, illuminates the ground region rearward of the vehicle.

9. The tailgate illumination system of claim 3, wherein the pivot end of the weighted arm comprises gear teeth that engage gear teeth of the pivot bracket.

10. The tailgate illumination system of claim 9, wherein the pivot bracket comprises (i) a body portion supporting the light source and (ii) a pair of pivot arms that protrude from opposite sides of the body portion and that are pivotally received at receiving portions of the tailgate bracket, and wherein one of the pivot arms has the gear teeth that engage the gear teeth of the pivot end of the weighted arm.

11. The tailgate illumination system of claim 1, wherein the pivot bracket comprises (i) a body portion supporting the light source and (ii) a pair of pivot arms that protrude from opposite sides of the body portion and that are pivotally received at receiving portions of the tailgate bracket so that the pivot bracket pivots relative to the tailgate bracket.

12. The tailgate illumination system of claim 1, wherein light emitted by the light source, when powered, projects an icon onto the ground region rearward of the vehicle.

13. The tailgate illumination system of claim 12, wherein light emitted by the light source, when powered, passes through a first part of a light-transmitting element when the tailgate is in the closed position and passes through a second part of the light-transmitting element when the tailgate is in the opened position.

14. The tailgate illumination system of claim 13, wherein the second part of the light-transmitting element comprises an optical magnifying element to magnify the projected icon when the tailgate is in the opened position.

15. The tailgate illumination system of claim 1, wherein the tailgate bracket is disposed at a handle bracket of a handle assembly of the tailgate, and wherein light emitted by the light source, when powered, passes through a light-transmitting portion of the handle bracket.

16. The tailgate illumination system of claim 1, wherein the light source is disposed at a circuit board, and wherein the circuit board is disposed in a housing having a lens, wherein light emitted by the light source, when powered, passes through the lens.

17. The tailgate illumination system of claim 16, wherein the housing is sealed.

18. The tailgate illumination system of claim 16, wherein the housing is sealed via potting material disposed at the circuit board at an opposite side of the circuit board from the light source.

19. A tailgate illumination system for providing illumination rearward of a vehicle having a tailgate, the tailgate illumination system comprising:

an illumination device, the illumination device comprising (i) a tailgate bracket configured for mounting at a tailgate of a vehicle, (ii) a pivot bracket pivotally mounted at the tailgate bracket and (iii) a weighted arm comprising a pivot end pivotally mounted at the tailgate bracket and a weighted end opposite the pivot end;

wherein the pivot bracket houses a light source disposed at a circuit board, and wherein the pivot bracket comprises a light-transmitting cover element, and wherein the light source, when powered, emits light that passes through the light-transmitting cover element of the pivot bracket;

wherein the tailgate of the vehicle is movable between a closed position and an opened position;

wherein, with the tailgate bracket mounted at the tailgate of the vehicle, the weighted arm pivots relative to the tailgate bracket responsive to gravitational force acting on the weighted end of the weighted arm as the tailgate moves from the closed position to the opened position, and wherein pivotal movement of the weighted arm imparts pivotal movement of the pivot bracket relative to the tailgate bracket;

wherein, with the tailgate bracket mounted at the tailgate of the vehicle, and with the tailgate in the closed position, light emitted by the light source, when powered, illuminates a ground region rearward of the vehicle; and wherein, with the tailgate bracket mounted at the tailgate of the vehicle, and when the tailgate is in the opened position, light emitted by the light source, when powered, illuminates the ground region rearward of the vehicle.

20. The tailgate illumination system of claim 19, wherein the pivot bracket pivots relative to the tailgate bracket about a first pivot axis, and wherein the weighted arm pivots relative to the tailgate bracket about a second pivot axis that is parallel to and offset from the first pivot axis, and wherein pivotal movement of the weighted arm about the second pivot axis relative to the tailgate bracket imparts pivotal movement of the pivot bracket about the first pivot axis relative to the tailgate bracket.

21. The tailgate illumination system of claim 20, wherein pivotal movement of the weighted arm about the second pivot axis is in a direction opposite from a direction of pivotal movement of the pivot bracket about the first pivot axis.

22. The tailgate illumination system of claim 20, wherein, as the tailgate of the vehicle moves between the closed position and the opened position, the weighted arm pivots about the second pivot axis as the weighted end of the weighted arm moves from one side of the second pivot axis to another side of the second pivot axis due to gravitational force acting at the weighted end of the weighted arm to impart pivotal movement of the pivot bracket about the first pivot axis.

23. The tailgate illumination system of claim 20, wherein the pivot end of the weighted arm comprises gear teeth that engage gear teeth of the pivot bracket.

24. The tailgate illumination system of claim 19, wherein light emitted by the light source, when powered, projects an icon onto the ground region rearward of the vehicle.

25. The tailgate illumination system of claim 19, wherein the tailgate bracket is disposed at a handle bracket of a handle assembly of the tailgate, and wherein light emitted by the light source, when powered, passes through a light-transmitting portion of the handle bracket.

26. A tailgate illumination system for providing illumination rearward of a vehicle having a tailgate, the tailgate illumination system comprising:

an illumination device, the illumination device comprising (i) a tailgate bracket configured for mounting at a tailgate of a vehicle and (ii) a pivot bracket pivotally mounted at the tailgate bracket;

wherein the pivot bracket houses a circuit board having a light source disposed thereat;

wherein the illumination device comprises a light-transmitting cover element, and wherein the light source, when powered, emits light that passes through the light-transmitting cover element;

wherein the tailgate of the vehicle is movable between a closed position and an opened position;

wherein, with the tailgate bracket mounted at the tailgate of the vehicle, the pivot bracket pivots relative to the tailgate bracket responsive to gravitational force acting on the pivot bracket as the tailgate moves from the closed position to the opened position;

wherein light emitted by the light source, when powered, passes through a first part of the light-transmitting cover element when the tailgate is in the closed position and passes through a second part of the light-transmitting cover element when the tailgate is in the opened position;

wherein, with the tailgate bracket mounted at the tailgate of the vehicle, and with the tailgate in the closed position, light emitted by the light source, when powered, illuminates a ground region rearward of the vehicle; and wherein, with the tailgate bracket mounted at the tailgate of the vehicle, and when the tailgate is in the opened position, light emitted by the light source, when powered, illuminates the ground region rearward of the vehicle.

27. The tailgate illumination system of claim 26, wherein the illumination device comprises a weighted arm comprising a pivot end pivotally mounted at the tailgate bracket and a weighted end opposite the pivot end, and wherein the weighted arm pivots relative to the tailgate bracket responsive to gravitational force acting on the weighted arm as the tailgate moves from the closed position to the opened position.

28. The tailgate illumination system of claim 26, wherein the pivot bracket comprises (i) a body portion supporting the light source and (ii) a pair of pivot arms that protrude from opposite sides of the body portion and that are pivotally received at receiving portions of the tailgate bracket so that the pivot bracket pivots relative to the tailgate bracket.

29. The tailgate illumination system of claim 26, wherein light emitted by the light source, when powered, projects an icon onto the ground region rearward of the vehicle.

30. The tailgate illumination system of claim 29, wherein the second part of the light-transmitting cover element comprises an optical magnifying element to magnify the projected icon when the tailgate is in the opened position.

31. The tailgate illumination system of claim 26, wherein the tailgate bracket is disposed at a handle bracket of a handle assembly of the tailgate, and wherein light emitted by the light source, when powered, passes through a light-transmitting portion of the handle bracket.

\* \* \* \* \*